United States Patent [19]

Heintzman

[11] Patent Number: 5,443,421
[45] Date of Patent: Aug. 22, 1995

[54] ROCK DISCHARGE ASSEMBLY FOR HAY CRUSHER

[76] Inventor: Rick Heintzman, R.R. 2, Box 265, Onaka, S. Dak. 57466

[21] Appl. No.: 94,523

[22] Filed: Jul. 20, 1993

[51] Int. Cl.⁶ .......................................... A01F 12/16
[52] U.S. Cl. .................................................. 460/106
[58] Field of Search ........................... 460/106, 105; 56/10.2 J

[56] References Cited

U.S. PATENT DOCUMENTS

| | | | |
|---|---|---|---|
| 3,224,177 | 12/1965 | Adee . | |
| 3,488,929 | 1/1970 | Hale | 56/1 |
| 3,608,286 | 9/1971 | Lausch et al. | 56/14.4 |
| 3,624,987 | 12/1971 | Lausch et al. | 56/1 |
| 4,216,641 | 8/1980 | Koch et al. | 56/14.4 |
| 4,288,969 | 9/1981 | Underhill | 56/10.2 |
| 4,335,562 | 6/1982 | Meyers et al. | 56/10.2 |
| 4,344,074 | 8/1982 | Strosser et al. | 340/684 |
| 4,433,528 | 2/1984 | Bohman | 56/10.2 |
| 4,657,029 | 4/1987 | Helm et al. | 460/106 |

Primary Examiner—Terry Lee Melius
Attorney, Agent, or Firm—Westman, Champlin & Kelly

[57] ABSTRACT

A spring loaded rock discharge assembly for use with hay mower-conditioner machinery including a plurality of spring fingers supported in an opening between a forage crop cutting mechanism and a conditioning roll. The spring fingers are sufficiently resilient, so that when dense objects such as rocks are carried to the conditioning rolls across the opening, the objects will cause the spring fingers to deflect and permit the rocks to discharge onto the ground.

11 Claims, 6 Drawing Sheets

ROCK DISCHARGE ASSEMBLY FOR HAY CRUSHER

BACKGROUND OF THE INVENTION

The present invention relates to the use of a rock discharge assembly for a hay conditioner or crusher which permits rocks, lumps of dirt, and other dense objects to be discharged between a cut forage feeder and crushing rolls to avoid damage to the rotating parts used in the hay crusher.

A hay conditioning system known as the HAYBINE and sold by Ford New-Holland, Inc. of New Holland, Pa., utilizes a forage crop cutting assembly having a header with a sickle bar that will cut the standing hay (forage crop), and a feed auger which conveys the hay from one or both ends of the header toward a central portion of the header wherein the cut forage forms a windrow that is somewhat cohesive. The windrow is moved rearwardly with paddles on the auger through a discharge opening in the rear wall of the header and into the "nip" of (between) a pair of hay conditioner rolls for crimping. The rolls are power driven and will cause a crushing or crimping of the hay stems and leaves, permitting more rapid curing or drying of the hay. See for example U.S. Pat. Nos. 3,624,987 and 4,216,641.

In areas of the country where there are rocks or stones of significant size, a problem has developed in that rocks will be hit with the feed paddles, and moved back toward the conditioning rolls across a space between the rear wall and the conditioner roll. Also, large hard clumps or "clods" of dirt, and scalped off sod give the same problem. The rolls are of a size such that when the rocks exceed a particular size, they will not pass through the rolls, but rather will be ejected forwardly back toward the auger paddles. The transition section has a solid bottom panel so the rocks are retained in this region. Damage to the auger paddles or feed mechanism for feeding the hay into the roll thus may occur, and unless the operator stops and removes the rocks, these rocks can be batted back and forth between the rolls and the feed mechanism paddles until damage occurs.

SUMMARY OF THE INVENTION

The present invention relates to a rock, stone, or dirt clods removal gate for permitting heavy dense objects to be discharged from the feeding path of a forage crop mower-conditioner. The removal gate is a discharge assembly that permits the dense objects in a transition section between a forage crop feeder and conditioning rolls to drop through to the ground when the object is over a certain size. The dense objects are removed from the material flowpath without causing damage to the conditioner components.

The normal sheet metal pan that spans an open space between the hay windrow feed mechanism and the conditioning rollers is replaced with a deflecting rock removal assembly that will deflect downwardly to permit rocks (the term "rocks" will be used for convenience) to be dropped to the ground and not carried into the conditioning rolls, particularly when the rocks are quite heavy and large. The rock removal assembly is preferably made of a series of laterally spaced spring fingers or teeth that span the space between the hay feed mechanism comprising the header used for cutting the hay, and the conditioning rolls in at least selected locations, and which are sufficient in strength to carry a windrow of hay across to the conditioning rolls. The fingers or supports are spring loaded and deflectable to permit the heavier materials, such as rocks, to drop down through the open space and onto the ground. The deflecting parts can be material other than spring fingers, but if one or more deflecting panels are utilized, the panels must be spring loaded such that the parts will deflect out of the way and permit rocks to drop downwardly under the weight of the rocks or objects and also lets dirt drop through.

In a second preferred embodiment, spring fingers are projected between the hay feed mechanism and the rolls, and these fingers are staggered in length to provide regions of greater space between the end of the fingers and the rolls, while other fingers extend the full distance between the header and the rolls to provide adequate support for the hay windrow, which generally is quite low in density, and yet have a space where larger dense objects, such as rocks, can drop through without excessive deflection of the fingers.

A modification is to provide a spring loaded panel directly below the auger, which also deflects to permit rocks to pass below the auger without damaging it, and the rocks then pass over the rock removal assembly, which is mounted to a rear edge of the deflecting panel, for discharge onto the ground.

The invention has its primary use in situations where the hay, after it has been severed, is formed into a swath or windrow and then moved with the feeding mechanism into conditioning rolls.

DETAILED DESCRIPTION OF THE PREFERRED EMBODIMENTS

A mower conditioner indicated at 10 for cutting hay is adapted for mobile movement over the ground, and is shown quite schematically. A frame 12 is provided, and the machine can be towed in a suitable manner by a prime mover, or it can be self-propelled if desired. In the form shown, the frame 12 supports a header 16 that is pivotally supported on the frame by a floatation linkage to permit the header 16 and a cutter bar 18 to move across the ground in a conventionally known manner. The machine shown is a mower-conditioner made by Ford New-Holland, Inc. of New Holland, Pa., and is shown only schematically for illustrating the principles of the present invention. U.S. Pat. Nos. 3,624,987 and 4,216,641 illustrate the basic machine arrangement.

Figure 1:
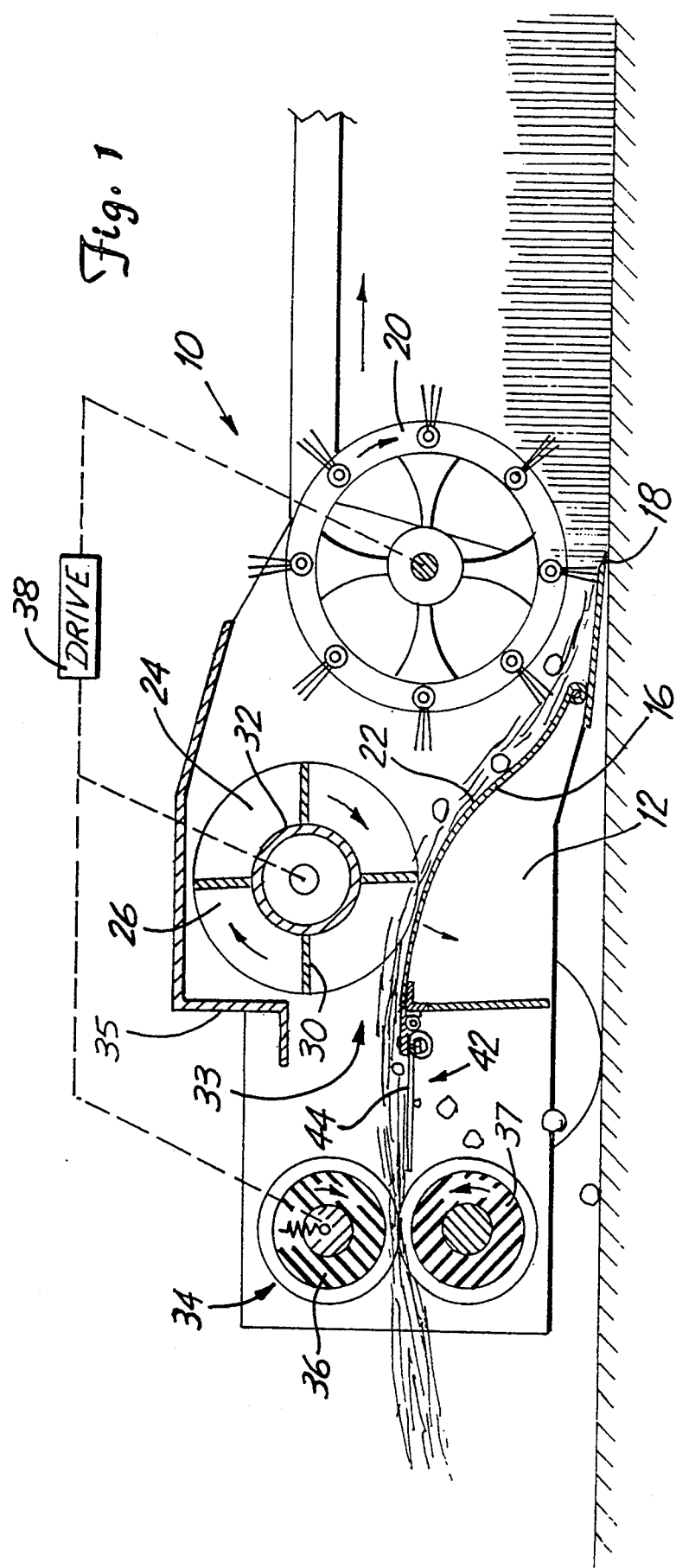
FIG. 1 is a side part sectional schematic view of a typical hay conditioner assembly, schematically illustrating the positioning of the cutter bar, the feed reel, and a header and auger in relation to the conditioning rolls.
Figure 2:
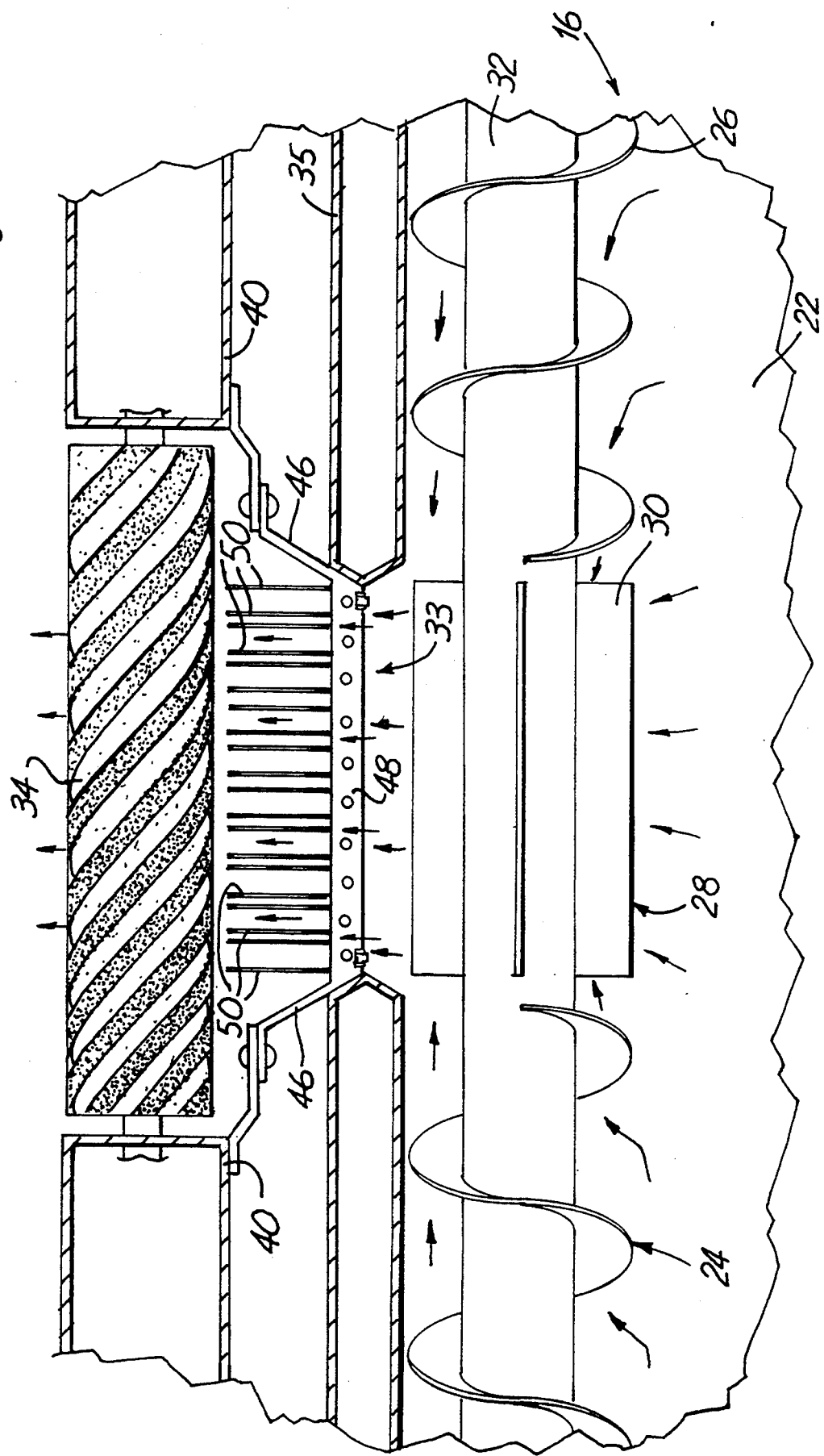
FIG. 2 is a schematic top view of the device of FIG. 1.
Figure 3:
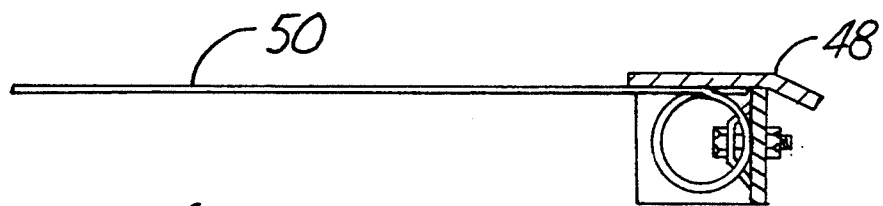
FIG. 3 is a fragmentary side view of a spring tooth of a rock removal system of the present invention.
Figure 4:
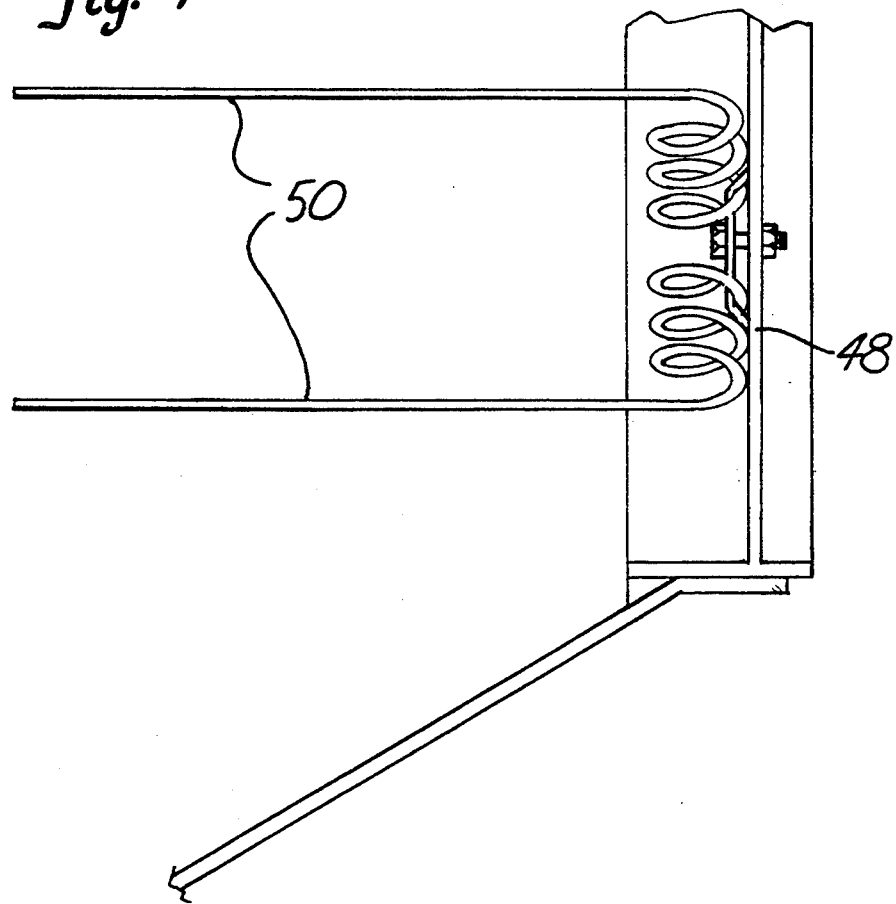
FIG. 4 is a bottom plan view of the spring tooth of FIG. 3.

The cutter bar 18 is fixed to the front of the header and is a conventional sickle knife cutter used to sever forage crops (hay) in a known manner. A crop reel 20 is provided on suitable supports on the header and is driven to help move the crop material across the sickle bar and into the header platform 22. An auger 24 that is power driven for rotation is mounted on the header platform, and includes auger flights or blades 26 on a central auger tube 32. The auger flights convey material from the ends of the header toward a central area indicated at 28 in FIG. 2, which has a series of radial paddles 30 mounted onto the central auger tube 32. These paddles 30 push the forage crop to discharge the cut material that is then formed into a swath or windrow in the central area of the auger, through a suitable discharge opening 33 in the back panel 35 of the header, and across a space or gap into a forage crop conditioning mechanism 34 for crushing the forage or hay. The conditioning mechanism comprises an upper roll 36 and a lower roll 37, both mounted for rotation about parallel axes to the frame and power driven by a drive schematically shown at 38. The rolls are counter-rotating so material will be fed between them. The conditioning rolls generally are made of a suitable material, such as a suitable elastomer, and may have interfitting spiral flutes, as shown, or some surface treatment that will permit the conditioning rolls to receive the forage crop material and crush the crop material as it passes through the rolls. The rolls, 36 and 37, generally are spring loaded together and will yield and move apart a short distance to let forage material pass between them for crushing.

All of the foregoing is conventional construction, and in the conventional mower conditioner assembly utilizing a header and conditioning rolls as described, the space 42 between the opening 33 for the windrow in the rear wall or panel 35 of the header and the conditioning rolls 34 is spanned by a support platform or floor that is attached to the side frame members that support the conditioning rolls. These side frame members are shown schematically at 40. The use of a solid floor panel in this space 42 supports a forage windrow that is discharged into the conditioning rolls 36 and 37 adequately, but in situations where there are rocks, some of which become quite large, the reel 20 and header 16 will pick up rocks, and the reel 20 will bat the rock into the auger 24 across the platform 22, and then the auger 24 will move the rock to the center of the machine where the paddles 30 will bat the rock backwardly toward the conditioning mechanism 34. Because the conditioning rollers 36 and 37 are limited as to size or diameter, the nip or entrance area between the mating rollers is restricted as well, and large rocks will start to move between the rolls 36 and 37 and, if large, will be ejected or essentially spit back toward the auger 24. It becomes almost a pinball effect, with a rock batted back and forth, and an operator must stop and dig out the rock in a difficult to reach, rather confined area.

The present invention provides an improvement by removing the solid conventional panel from the space 42 and replacing the panel with a rock removal assembly indicated at 44 in the first form of the invention. The rock removal assembly 44 in this first form of the invention includes side mounting straps 46, one on each end, which are made to mount onto side frame member 40 of frame 12 in a suitable manner, such as with bolts or the like. A support bar 48 is supported on the side mounting strap and extends between them. The mounting bar is immediately to the rear and slightly underneath the curved header, so that as hay discharges out through the rear opening 33, the support bar 48 supports the hay. The support bar is right at the leading edge of the space 42. The support bar 48 mounts a plurality of spaced spring fingers 50 that extend across the space 42 to immediately in front of the lower one of the conditioning rollers 37. The spring fingers 50 can be constructed as desired, but generally will have a coil 54 at their base end that attaches to the support bar 48 with a suitable bolt, in much the same manner of a spring used with various reels for grain or forage harvesting. Each coil supports a pair of fingers. The fingers will extend out at a desired position. The spacing of the fingers 50 can be adjusted as desired, and the fingers can have a stiffness that is selected to permit rocks that are above a certain size and will not feed through the conditioning rolls 36 and 37 to be permitted to either drop between the fingers or to deflect the fingers sufficiently to permit discharge below the rolls and onto the ground without substantially affecting the transport of the hay windrow. The stems and branches of the forage crop in the windrow that is formed by the auger tends to intertwine and cling together, so the cut forage feeds fairly evenly.

The spring fingers 50 can be positioned so that there are varying lateral spaces between them, or they may be evenly spaced as desired. The spacing of the spring fingers, as shown, has two sets of fingers close together, a larger space, and then two more close fingers. This spacing is to provide support for fine hay while leaving some space for dense objects to drop through. Spring fingers 50 are relatively lightweight, and span the space sufficiently to provide support for the windrow of cut forage material as it is fed into the conditioning rolls and yet deflect or provide open spaces to permit rocks to drop through.

Figure 5:
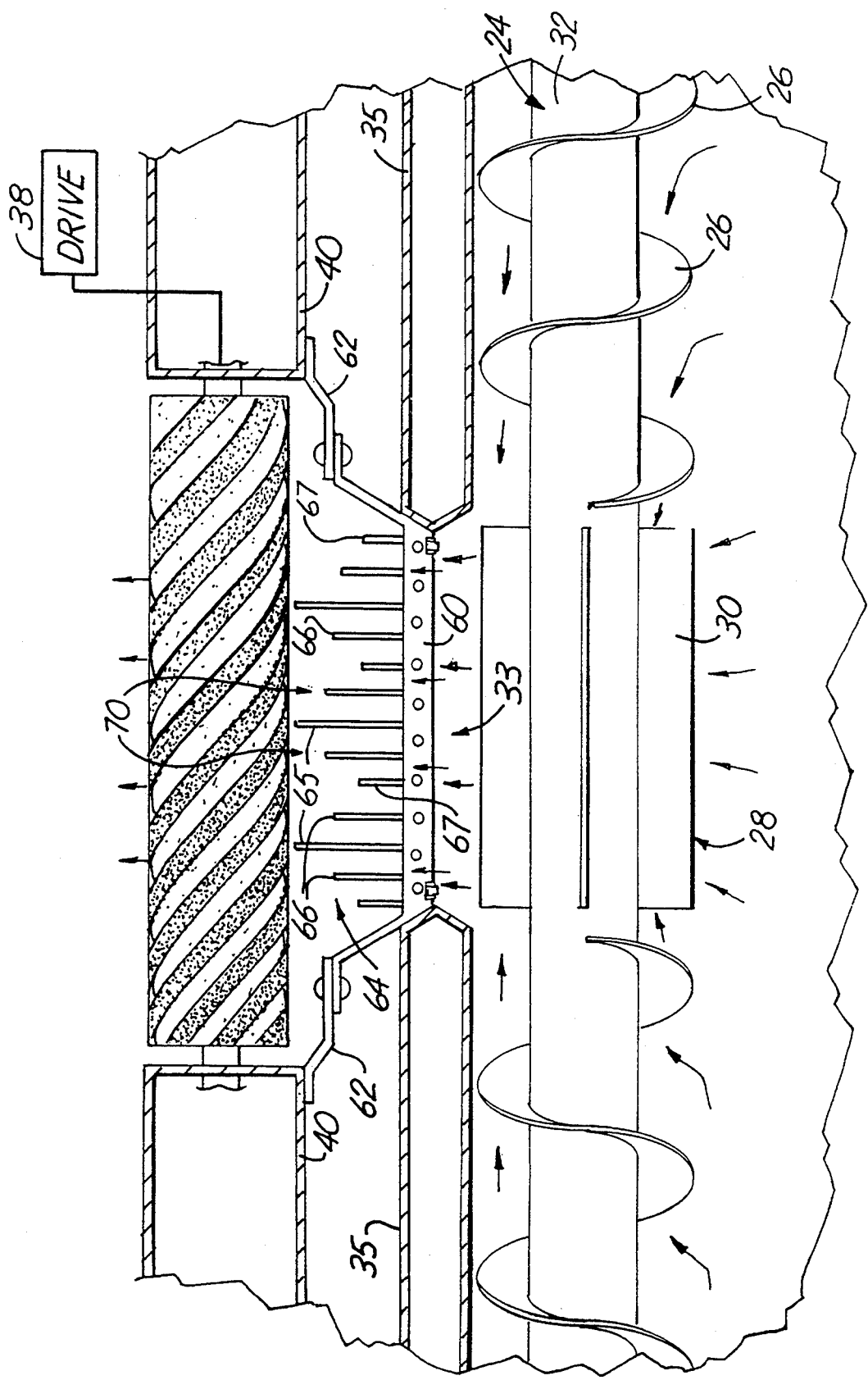
FIG. 5 is a top plan view of a modified form of the invention.

An alternate embodiment of the present invention is shown in FIG. 5, and in this form of the invention a support bar 60 provided and includes attachment members 62 similar to that shown in the first spring support, that can be attached to the side frame portions 40 of frame 12 in a suitable manner. The support bar 60 spans the opening 33 in the rear wall 35 of the header or platform, and in this form of the invention, the bar 60 supports a plurality of spring fingers 64 that are staggered in length, and include a plurality of long fingers 65, intermediate length fingers 66, and shorter fingers 67, that are arranged so that they will provide a plurality of support regions where the longer fingers 65 extend substantially all the way to the roll 37 for adequately supporting the windrow formed by the auger 24, and yet the short and intermediate length spring fingers leave a discharge opening indicated at 70 in at least two selected regions as shown through which rocks can drop without causing deflection of any fingers. In this form of the invention, the spring fingers can be stiffer than in the first form of the invention because of the openings that permit smaller rocks to drop through. If the weight of the rock is not sufficient to deflect the normal spring fingers, the long-intermediate-short teeth will eventually let the stone fall through the opening.

By eliminating rocks and stones and dirt, the conditioner rollers, which are made of elastomeric material, are protected, and will not be chewed up by rocks. Further, the auger itself will be protected from rocks being hurled against the paddles 30 when they are spit forwardly out of the rollers 36 and 37. Damage to the auger paddles 30 is reduced.

Figure 6:
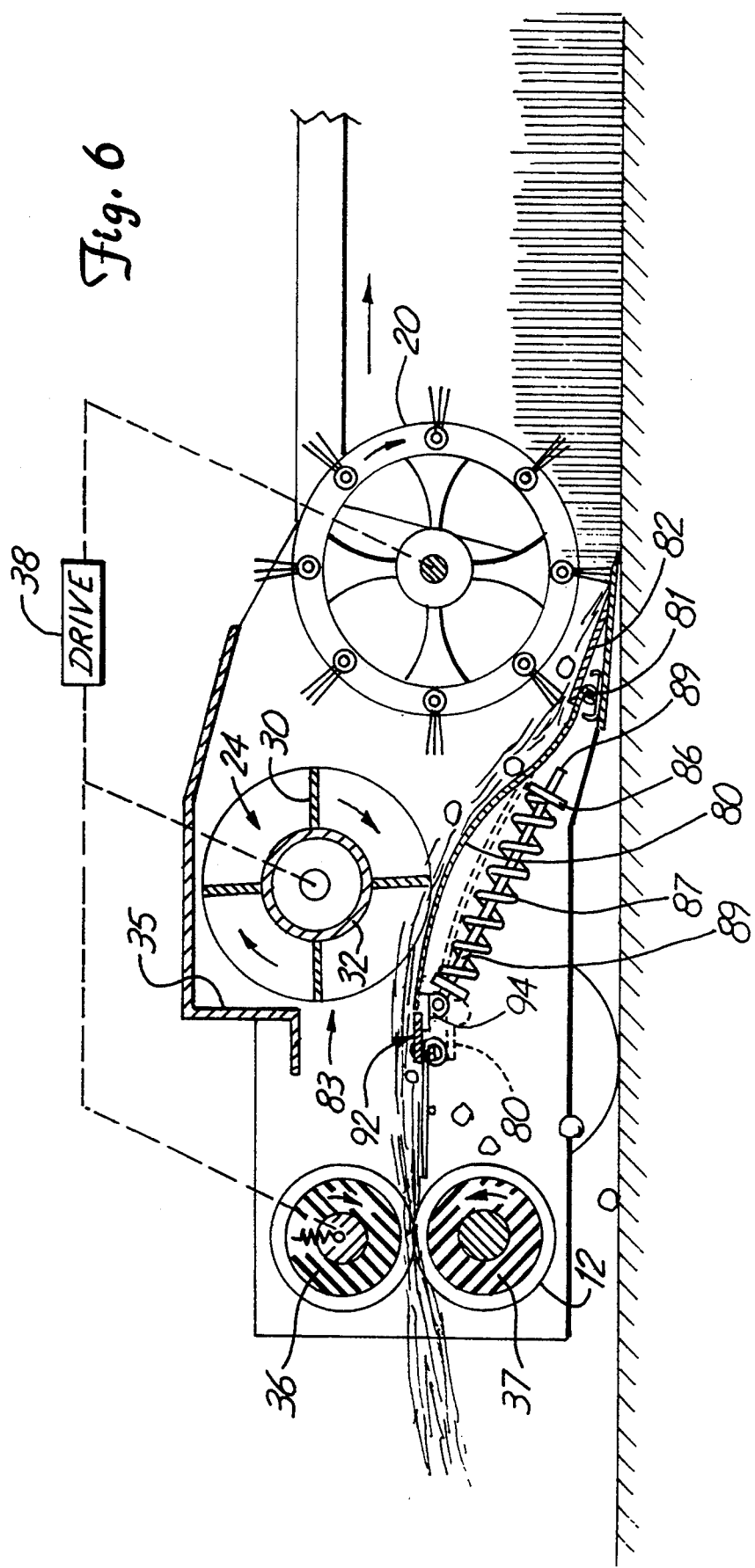
FIG. 6 is a side view of a further modified form of the invention using a spring loaded trap door for rock removal.
Figure 7:
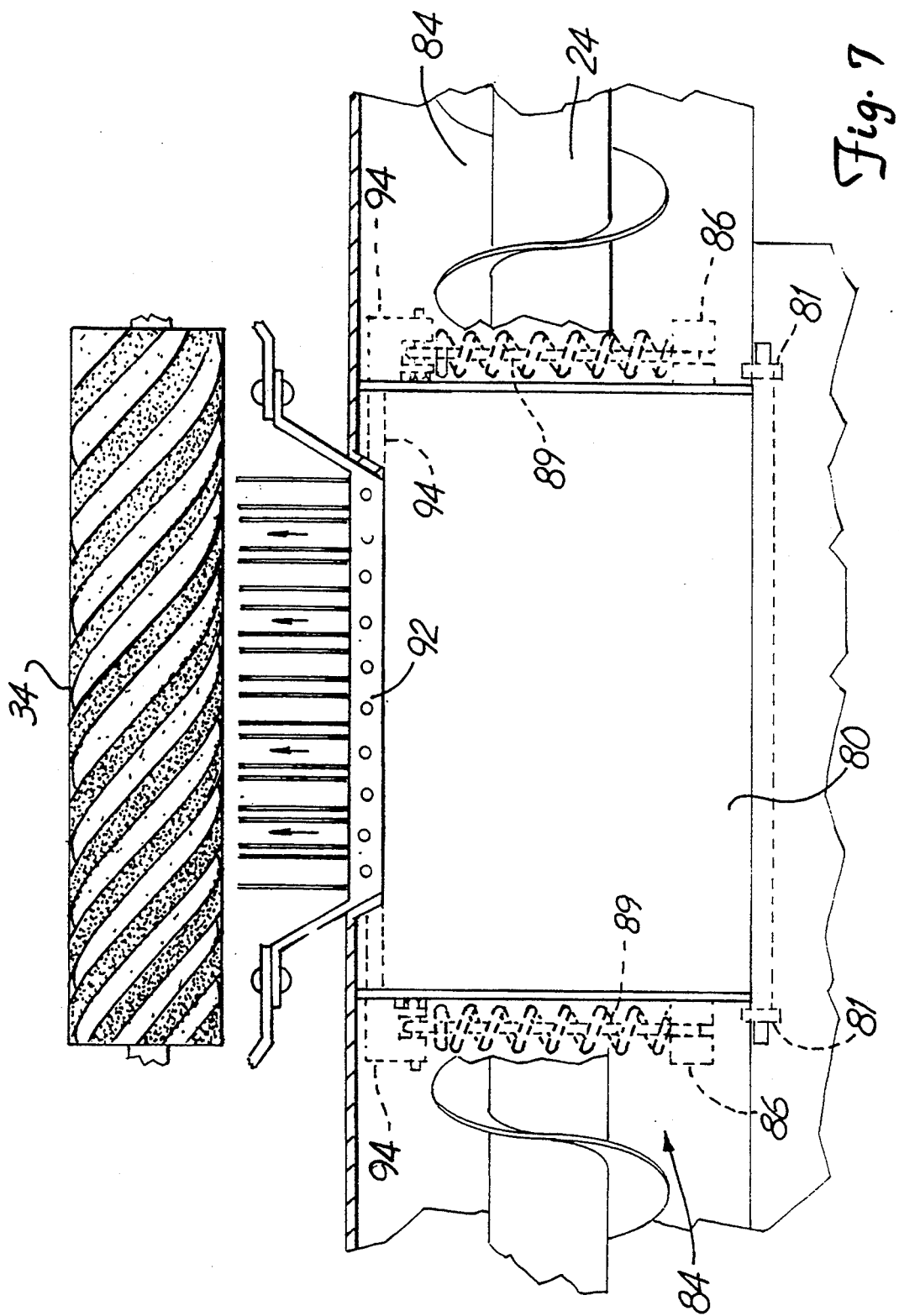
FIG. 7 is a fragmentary top view of the device of FIG. 6.

A further form of the invention provides for a spring loaded panel section below the auger 24, and is schematically shown in FIGS. 6 and 7. In this form of the invention, a panel 80 is hingedly attached to the bottom panel of the header, and spring loaded into place, so that in a normal operation it will be forming a continuation of the normal header or platform surface around the auger. As shown, the movable panel 80 fills an opening formed in the bottom wall of the header and is hingedly attached as at 81 to the header platform 82 forwardly of the discharge opening 83. The panel 80 forms part of the bottom and rear walls of the header where hay is moved back to the conditioning rolls by the paddles on the auger. The hinge 81 is supported below the forward part of the platform adjacent the cutter bar so hay slides without hanging up on the hinges. Panel 80 is hinged with a suitable hinge pin or other type of hinge 81 to the header bottom wall underneath the auger, and will pivot between a first position where it forms a continuation of the lower wall 84 of the header to a position where it is dropped down and spaced away from the auger 24 a greater amount, as shown in dotted lines in FIG. 6. Along each side of the panel 80 and rearwardly of the header, there is a rod 89 pivotally attached through an eye formed in the rod or with a rod end bearing to panel 80 adjacent the rock discharge assembly frame 92. The rods 89 pass through openings in and are supported on respective brackets 86 fixed to the underside of the header alongside the panel 80 near the header. A separate compression spring 87 is mounted over each rod 89 and supported on the respective bracket 86. A washer 91 is fixed adjacent at the top of each rod 89. The washers 91 bear on the respective spring 87 and when the panel 80 is urged to its solid line position by the springs. When a rock or other object passes under the auger 24, the panel 80 may be forced down by overcoming the spring force. The springs 87 are compressed as the panel 80 pivots downwardly. The panel 80 is urged to its normal position, where it forms a continuation of the header platform wall under normal conditions. The panel 80 is made to have stops to stop it in its normal working position. The rear edge of the panel 80 is used for supporting the spring tooth rock removal assembly frame, such as that shown at 92 which is the same as the spring frame 48, and which supports spring fingers that extend back to the conditioning rollers. The frame 92 can be bolted directly to the edge of panel 80 or on a suitable reinforcement.

When a large rock or a clump of sod, a clod of dirt or other debris is received by the auger and is conveyed to the center, the panel 80 will deflect out of the way by loading the springs 87 and will permit the rock to pass through the space under the auger 24 (which space will enlarge) without damaging the central portion 28 of the auger 24. The springs 87 compress and the panel 80 moves downwardly so the rock is discharged without causing substantial damage to the auger or header walls. This feature shown in FIGS. 6 and 7 can be used as an additional feature with the spring finger rock discharge assembly.

The spring finger discharge assembly can be utilized as a kit for replacement of the existing, conventional, solid panel between the header and the conditioning rolls on commercial machines. The discharge assembly will effectively prevent excessive damage from stones or rocks, as well as sod clumps, lumps or clods of dirt, heavy debris, or the like and will permit dirt picked up from rodent mounds to drop through. The discharge assembly permits stones and rocks that are as large as bowling balls to be safely discharged, and smaller stones, sod clumps scalped off the turf by the cutter bar, and clods of dirt that will not pass through the conditioning rollers will also be discharged. The spring fingers are flexible and heat treated so they can bend 90° and not yield. The finger units are made preferably to be three inches apart on the coils, but bolted on four inch centers, so the fingers are spaced one inch from the finger of an adjacent finger unit. ⅜" diameter heat treated music wire has been found to make a suitable spring finger.

Also, the fingers tend to pick up machine vibration and, thus, vibrate to aid in self cleaning of debris. Again, while rocks and stones are described as the major problem, dense objects such as scalped off clumps of sod, with a tangle of roots and dirt, as well as hard lumps of dirt (clay for example) will be discharged by the discharge assembly.

Although the present invention has been described with reference to preferred embodiments, workers skilled in the art will recognize that changes may be made in form and detail without departing from the spirit and scope of the invention.

What is claimed is:

1. In a forage crop conditioning machine having a mechanism for severing forage crop plants and feeding forage crop material to conditioning rolls for crushing, and frame means for supporting the mechanism for severing and the conditioning rolls with a space between the conditioning rolls and the mechanism for severing, the space being substantially unobstructed for passage of material therethrough to a ground surface, the improvement comprising a dense object discharge assembly positioned in the space and having a support frame, a plurality of horizontally and vertically resiliently deflectable members each having a first end attached to the support frame and a second end being freely deflectable, the deflectable members being spaced-apart at a selected spacing and extending substantially across at least portions of the space between the cutting mechanism and the conditioning rolls, the deflectable members being weight sensitive to permit dense objects larger than the selected spacing to deflect the deflectable members and drop through the space therebetween while providing support for forage crop material coming from the cutting mechanism and being fed to the conditioning rolls and to resiliently return to a rest position.

2. The machine of claim 1 wherein the cutting mechanism comprises a header having a sickle bar, a header platform, and an auger for conveying cut forage material into a windrow adjacent a discharge opening in the header, the conditioning rolls being spaced behind said discharge opening, and the discharge assembly being mounted for supporting the windrow immediately behind the discharge opening.

3. The machine of claim 2 wherein the discharge assembly comprises dense object deflectable spring fingers which span at least portions of the space.

4. The machine of claim 3 wherein said spring fingers comprise a plurality of fingers having a plurality of different lengths so that there are open areas in the space not occupied by spring fingers.

5. The machine of claim 3 wherein there are pairs of fingers spaced more closely together than other pairs of fingers to provide different spacing between fingers.

6. The machine of claim 2 and a deflectable panel forming a part of the header platform and being spring loaded to permit the panel to deflect under spring load.

7. A forage crop conditioner machine including a header having a sickle bar for severing forage crop plants and for feeding forage crop material to crop conditioning rolls mounted on a frame and spaced from the header for crushing, and frame means for supporting the mechanism for severing and the conditioning rolls with a space between the conditioning rolls and the mechanism; an assembly of a plurality of spaced apart spring fingers having a first end connected to the frame means and a second end being freely deflectable, the spring fingers extending substantially across at least portions of the space between the header and the conditioning rolls, the spring fingers having spaces between them for permitting material to drop between them and being weight sensitive to permit dense objects larger than the spaces between the spring fingers to horizontally and vertically resiliently deflect the fingers to permit discharge of such objects to a ground surface and to resiliently return the fingers to a rest position, while providing support for forage crop material coming from the header to the conditioning rolls.

8. The machine of claim 7 wherein the header comprises a header platform and an auger for conveying cut forage material into a windrow adjacent a discharge opening in the header, the conditioning rolls being spaced behind said discharge opening, and the spring fingers being mounted for supporting the windrow immediately behind the discharge opening.

9. The machine of claim 8 wherein said spring fingers comprise a plurality of fingers having a plurality of different lengths so that there are open areas in the space not occupied by spring fingers.

10. The machine of claim 7 wherein the spring fingers have pairs of fingers spaced closely together with a greater space between adjacent pairs of fingers than the spacing of fingers in the first mentioned pairs.

11. The machine of claim 10 wherein the fingers of each pair of fingers are spaced substantially one inch apart and the pairs are substantially three inches apart.

* * * * *